United States Patent [19]

O'Hare

[11] Patent Number: 4,795,617
[45] Date of Patent: Jan. 3, 1989

[54] ELECTROLUMINESCENT CHEMICAL ACTIVATION SYSTEM

[76] Inventor: Louis R. O'Hare, 6101 Sequoia Rd., NW., Apt. A-20, Albuquerque, N. Mex. 87120

[21] Appl. No.: 571,349

[22] Filed: Jan. 16, 1984

[51] Int. Cl.$^4$ ............................................. B01J 19/08
[52] U.S. Cl. ............................ 422/186.15; 422/186.23
[58] Field of Search ............... 422/186, 186.03, 186.04, 422/186.05, 186.06, 186.21, 186.22, 186.23, 186.26, 186.27, 186.28, 186.29, 186.3; 204/177, 169, 179; 423/402, 400, 405; 252/301.4 R, 301.4 P, 583, 432 R

[56] References Cited

U.S. PATENT DOCUMENTS

| | | | |
|---|---|---|---|
| 1,388,112 | 8/1921 | Hoofnagle | 423/402 |
| 1,400,959 | 12/1921 | Koetschet | 422/186.04 |
| 1,547,714 | 7/1925 | Andriessens | 423/405 |
| 1,813,514 | 7/1931 | Schmidt et al. | 422/186.04 |
| 1,853,688 | 4/1932 | Leffer | 422/186.04 |
| 1,909,215 | 5/1933 | Nashan | 422/186.04 |
| 3,049,488 | 8/1962 | Jackson et al. | 422/186.29 |
| 3,421,988 | 1/1969 | Rochow | 204/164 |
| 3,674,666 | 7/1972 | Foster et al. | 422/186.05 |
| 3,734,849 | 5/1973 | Schmedding et al. | 422/186.05 |
| 3,983,021 | 9/1976 | Henis | 204/164 |
| 4,267,027 | 5/1981 | Amouroux et al. | 204/179 |
| 4,351,734 | 9/1982 | Kauffman | 422/186.07 |
| 4,451,436 | 5/1984 | O'Hare | 422/186.29 |

FOREIGN PATENT DOCUMENTS 55-631 6/1980 Japan ............................... 422/186
1216019 12/1970 United Kingdom .

Primary Examiner—Barry S. Richman
Assistant Examiner—T. J. Wallen

[57] ABSTRACT

The mechanisms and methods employed in the generation of electroluminescence are adapted to provide induced chemisorbtion and induced catalytic effects when electric fields and the passage of electric current through electroluminescent phosphors are used to raise phosphors and other phosphor-like grains into excited energy states from which the excited-state energy is transferred to reactant gases absorbed on the surface of the grains in order to provide energy of activation for those gases to thereby cause them to react chemically. According to the function of this invention certain compounds, having catalytic properties induced in them by absorbing energy, are capable of being stimulated electrically into a catalytically active state by the mechanisms that produce electroluminescence and these mechanisms are then employed with a variety of phosphors and phosphor-like grains to provide a chemical activation system.

17 Claims, 1 Drawing Sheet

ELECTROLUMINESCENT CHEMICAL ACTIVATION SYSTEM

This invention is a type of chemical activation system. In it chemical activation energy is provided by contacting reactants onto an electrically excited surface. The surface of excited state material functions as a catalyst with enhanced catalytic powers when it is electrically excited. The electric excitation may be either direct or indirect. It is direct when an electric field or electric current excites the grains of certain compounds into an induced catalytic condition by the passage of the electric field or current itself through the grains without an intermediate energy conversion system. It is indirect when electricity produces ionization in gases or when it first produces light in other phosphor grains and then the products of those electric effects are employed to induce catalytic effects in excited state compounds. In the prior art reactant gases are often excited and the excited gas species are then reacted directly in the gaseous state or they are subsequently reacted on a suitable catalyst. The present invention concerns ways of activating the catalyst itself. In some embodiments the activation of the catalyst requires electric discharge through a reactant gas, but in this case it is the catalyst and the gas which are then activated by the discharge. These embodiments utilize localized discharges between the grains throughout a large volume of a catalytic bed. Each grain is subjected on all sides to the effects of the discharge. Some grains are designed to be excited by the ultraviolet effects from the gas discharge. Other grains are designed to be excited by the electron impact of the localized discharges etc. Other embodiments resemble photocatalysis art in that some grains provide electroluminescent light and then photocatalytic grains in turn convert the light to excited states for enhancing catalytic effects. This embodiment provides a novel way of stimulating all sides of each photocatalytic grain in a large bed of such grains. The primary embodiment, on the other hand, concerns the catalytic effects available on the very surfaces that are being excited into electroluminescence by the direct action of the electric field. In the former art the activation of the gas takes place first in the gas and the gas particles are excited in order that they might then better interact with the catalyst surface, but in the present case a special kind of catalytic surface is modified both by electrically excited gas particles and by the direct action of electric current on the catalyst material. Examples of previous activation systems in which the gas reactants are activated directly by electric discharge through the gas and subsequently reacted on a catalyst are in U.S. Pat. Nos. 1,909,215 and 3,421,988. In these patents by Paul Nashan and Eugene Rochow ionizing wires at high electric potential cause electric current to flow through the reactant gas itself and the gas is contacted on catalytic surfaces to produce a product. In other prior art contained in U.S. Pat. No. 3,983,021 gases are "simultaneously exposed to the discharge and to the solids", but in this invention of Jay Henis he is disassociating nitrogen oxides into its components of nitrogen and oxygen rather forming a compound. In an invention of Jaques Amouroux et al, U.S. Pat. No. 4,267,027 an inductive discharge first excites nitrogen and oxygen molecules and then reacts the excited gas species on a catalyst. A British Pat. No. 1,216,019, issued to Zaklady Azotowe describes the placement of a $PtO_2$ catalyst between electrodes of a discharge thereby subjecting ammonia directly to electric current.

In each of the above inventions gas or vapor is directly excited by the action of electric current moving in the gas itself. The current travels through the gas by ionizing the gas. The ionization of the gas is one type of excitation, but other types of excitation occur when electrons in the current collide with orbital electrons of the gas particles and the collision not only removes some orbital electrons to produce positive ions but also impells some electrons into wider orbitals without dislodging them completely from the atom or molecule. Those gas particles having electrons impelled into special orbitals by impact are in a chemically excited state and are often able to react more readily with other chemical species to form new compounds. Also electrons in the electric current stream often combine with ions and the new combinations can result in gas particles which have an electronically excited state. There is also an effect that is due to the emission of electromagnetic energy from the gas discharge. The different types of light energy, as for instance the ultraviolet light generated by recombinations of electrons with positive ions, also produces excited states in the gas particles which absorb it. Once raised to various excited states by any of a wide variety of mechanisms such as those described many gases react with other chemical species with which they would otherwise not react in an unexcited state. One excited state of particular interest is the vibrationally excited state. Molecules excited vibrationally rather than electronically require less energy for induced chemisorbtion on the surface of an appropriate catalyst. This means that the reactions that can be achieved through this excited state can be made to occur with greater energy efficiency and less energy cost. The use of this type of excited state can be seen in the Amouroux patent cited above.

In Amouroux and in my copending application Ser. No. 442,367, now U.S. Pat. No. 4,451,436 there are certain disadvantages which the present invention overcomes. Accordingly, it is the objective of the present invention to provide excited state gas species less expensively by obviating the costly and expensive requirement of the electric discharge through a gas in order to provide the excited gas particles. This is to be accomplished in one embodiment by the use of true electroluminescent grains as the catalytic material. True electroluminescence in the strict sense of the definition of that word does not depend on localized electric discharges in the gas which occupies the interstities between the phosphor grains. By using electrically excited electroluminescent grains as the catalytic contact material a number of advantages are achieved. Firstly, a large quantity of high frequence ultraviolet light is not generated in an area where it is able to destroy product. The invention of Jay Henis, U.S. Pat. No. 3,983,021, shows the disassociating power of that radiation for nitrogen oxides. Secondly, the energy that would be lost by the radiation of ultraviolet light which is not absorbed and converted into excited state gas species is reduced or curtailed because much less high energy ultraviolet light is generated and the ultraviolet which is generated is not generated in a position where it can radiate through the gas and off into space without producing excited species. Since most electroluminescent grains can be excited with less voltage at higher gas pressures than the voltages required to produce an electric gas discharge under comparable conditions, an objective of the present invention is to reduce the energy requirement previously needed for the higher voltage. In a similar way the energy required for pumping vacuums for some prior discharges is removed. Another objective of this present invention is to provide a compact system in which catalytic surfaces are activated directly by the passage of electric current through the grains of the catalyst. According to this objective surfaces, which are not significantly chemisorbtive nor are strong catalysts to react certain gases, are made to become chemisorbtive and catalytic by being placed in an electric field which is able to raise the surfaces to excited energy states. An objective of one embodiment of the inventive concept is to use a combination of electric current and light energy to activate a surface and induce catalytic effect on the surface. This objective provides for the choice of a chemical activation material which is both photoluminescent as well as electroluminescent. The advantage of electric activation of electroluminescent phosphors which become catalytic when activated is that the surface area that must be exposed to external light source is very greatly reduced because all the grains, even those deeply embedded in the interior of the bed, can receive excitation from the electric current flowing through the bed. The cost of a reaction chamber is reduced when the design of the chamber does not require each excited grain be held in a position in which it can be exposed to an external source of light.

The principal embodiment of the present inventive concept concerns electroluminescence as a primary phenomena although it is not intended to exclude apparent electroluminescent phenomena from the invention. Apparent electroluminescence occurs in phosphors which are only photoluminescent in that they fluoresce only in response to activation by light energy. When placed in an electric current path they appear to emit light by the direct influence of the electric field but actually they are converting one form of light to another. The field produces localized electric discharges in the gas between the phosphor grains. Then the photoluminescent grain converts the ultraviolet light from the discharge into visible light. In a secondary embodiment of the inventive concept apparent electroluminescence is used as a way of activating a deep bed of purely photoluminescent phosphors which have catalytic qualities when excited. It is a way of providing a bath of light on all sides of a large number of photocatalytic grains.

But in the primary embodiment strictly defined electroluminescent material is employed as the excited state catalytic material. The phosphor grains may be incidentally photoluminescent as well as electroluminescent but they are essentially electroluminescent in that they can be excited without any localized electric gas discharge and in response to an electric field traversing them. Here the phosphor grains receive their excitation and concomitant catalytic properties directly by the passage of an electric field through them.

It is not intended to limit the invention to the use of phosphors alone nor to restrict the invention to a condition in which electroluminescent phosphors simultaneously emit light and produce a catalytic effect because according to the purpose of this invention the phosphors are merely excited by the mechanisms and methods of electroluminescence. The actual radiative recombination from the excited state to an unexcited state is not necessary because the chemical absorbtion of the reactant gases on the phosphor or phosphor-like grains often quenches luminescence and enables non-radiative recombination from the excited state to the ground state. The employment of non-radiative recombination in association with the apparatus and mechanisms associated with electroluminescent cells is desireable because it means that the energy associated with the excited state is not to be wasted in the form of emitted light, but rather that it will provide the energy of activation to react the gases absorbed on the grains. The methods and practices of electroluminescence often produce excited states in chemical compounds which do not result in the emission of light energy. Even in electroluminescent phosphors only a fraction of excited state energy is liberated as light by radiative recombination. Much energy is liberated from the excited states of the solid compounds by surface recombination. It is especially the energies of surface recombination, which effect the chemistry of gases and vapors absorbed on the surface, that are responsible for inducing catalytic effects on the surfaces. It is the purpose of this present invention then in some embodiments to use the mechanisms and art of electroluminescent cells to produce excited states in some compounds without necessarily producing luminescence. For instance the direct electric stimulation of some compounds is achieved in an electroluminescent cell without localized gas discharge between the grains of the compound and even without the emission of light but only for the purpose of providing an excited state in the compound and then recombination from the excited state by surface recombination. In this way a new kind of catalytic surface is provided by using some selected mechanisms from the electroluminescent cell.

In the principal embodiment of this invention a capacitive electroluminescent cell is employed in which the phosphor and phosphor-like grains are well insulated from the electrically conductive electrodes which form the plates of the capacitor and an alternating current is applied to the electrodes, but in other embodiments an electrically conductive cell is employed which uses direct corrent and the current flows directly through the phosphor or phosphor-like compound from one electrode to the other. In one embodiment the capacitive cell is resonated with the frequency of the alternating current driving it by means of an inductor connected in parallel with it. In this way the voltage-amperage-reactive of the resonant circuit cycles back and forth without consuming electric power and only the energy actually absorbed by the cell in the form of electric watt energy is required to drive the cell. This provides for a greater electric efficiency for the system.

Further clarification of the operation and embodiments may be had now by referring to the drawings.

FIG. 1 of the drawings shows a cross sectional view of a simple electroluminescent cell having a liquid electrolyte upper conductor.

FIG. 2 of the drawings shows a capacitive electroluminescent cell with an electrically conductive glass upper plate.

Figure 1:
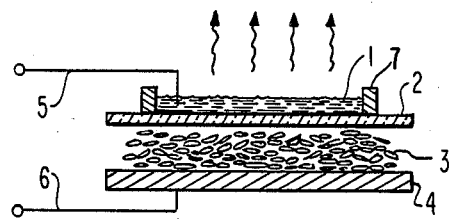

Referring then to FIG. 1 of the drawings, a capacitive type electroluminescent cell is shown which is comprised of four basic elements. The first basic element is a transparent, electrically conductive layer 1 which serves as one of two plates of a capacitor. In this FIG. 1 the layer 1 is an electrolytic solution such as a transparent solution of water and sodium chloride. The second basic element of the cell is an insulating layer 2 which serves as the dielectric for the capacitor and insulates the phosphors 3 from the second capacitor plate 4. The dielectric material 2 is made of transparent insulating material in order to transmit light emitted by the third basic element 3 which is the electroluminescent material. The layer 2 may be of glass, mica, transparent plastic such as mylar etc. and the electroluminescent phosphors 3 are in the form of grains or plates of sintered compounds such as zinc sulphide, cadmium sulphide, cadmium selenide, gallium phosphide, gallium arsenide and the like. The compounds are employed with or without doping and activators according to the present practice of the art. The fourth basic element of the electroluminescent cell is the second capacitor plate 4 which is in the form of an electrically conductive material such as a metal plate. The capacitor members 1 and 4 are connected to a source of alternating current by conductors 5 and 6. The alternating current electric field between 1 and 4 excite the phosphors 3 and raise them to a higher energy state than the one they occupy when unexcited. Light is emitted from the phosphors 3 when they loose a fraction of their excited state energy by a process of radiative recombination. Other excited state energy absorbed from the electric field is given up by phonon emission, by auger processes and by surface recombination. Electrolyte retaining ring 7 is sealed along its bottom surface to insulating layer 2 in order to retain electrolyte 1 on 2.

Figure 2:
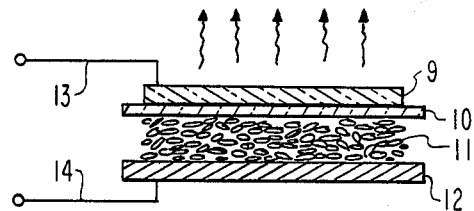

Next in FIG. 2, the electrically conductive plate 9 serves the same purpose as the electrolyte 1 in FIG. 1. In this FIG. 2 the plate 9 is of electrically conductive transparent material such as glass or plastic which has a transparent coating of electrically conductive material such as gold or stannic oxide. The insulating layer 10 is the same as layer 2 in FIG. 1. In this FIG. 2 phosphors 11 are the same as 3 in FIG. 1, and 12 in FIG. 2 is the same as 4 in FIG. 1. Connectors 13 and 14 are the same as 5 and 6 of FIG. 1.

Figure 3:
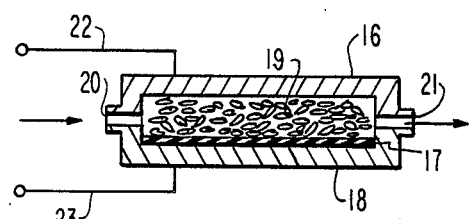
FIG. 3 shows a capacitive cell like an electroluminescent cell which has inlet and outlet fluid ports for contacting phosphor-like material within the cell with gases and vapors.

Now in FIG. 3, the elements of electroluminescence cells shown in FIGS. 1 and 2 are present but in a modified form. These elements are used to produce excitation in phosphors and in phosphor-like compounds according to the description of FIG. 3 just as they are in the first two FIG.s, but in FIG. 3 provision is not necessarily made for the emission of light from the cell as the excited state energy is used for chemical activation rather than for light production. In this FIG. 3 the plate 16 serves the same general purpose as capacitor plate 1 and capacitor plate 9 in FIGS. 1 and 2 respectively except that in this FIG. 3 the plate 16 need not be transparent but may be made of reflective or opaque electrically conductive materials. The insulating layer 17 like the layer 2 of FIG. 1 provides for the electric insulation of the phosphors from the capacitor plates and it provides dielectric for the capacitor. The second plate of the capacitor is plate 18. Excited state material 19 is electroluminescent phosphor material which has special catalytic effects when raised to an excited state by an alternating electric field or by the passage of an electric current. In one embodiment 19 is excited state material of a kind which does not undergo radiative recombination but has catalytic properties when activated by the passage of an alternating electric field or by the passage of a direct electric current. Phosphor and phosphor-like material 19 is located between capacitor plates 16 and 18. Inlet duct 20 admits reactant gases or vapors for surface contact on 19. Exit duct 21 provides for removal of product species. Alternating current electric energy is delivered through conductors 22 and 23.

Figure 4:
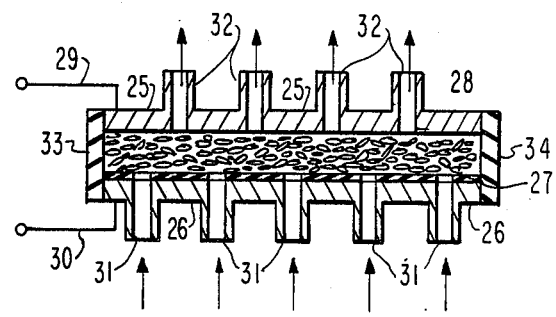
FIG. 4 shows a catalytic type cell configured like an electroluminescent cell having perforated capacitor plates above and below catalyst material and multiple inlet and exit ports.

Referring to FIG. 4, in the principal embodiment the perforated plates 25 and 26 function as the plates of an electric capacitor. The plates are separated from one another both by insulating film 27 and by phosphor-catalytic material 28. In this embodiment an alternating current across 25 and 26 stimulates 28 into an excited state. In an alternate embodiment in place of an alternating current a direct current is placed across connectors 29 and 30 and perforated plates 25 and 26 function as electrodes instead of as capacitor plates. In this alternate embodiment insulating film 27 is omitted and current flows directly through 28. Inlet ducts 31 admit reactant gases in a direction parallel to current flow and exit ducts 32 remove the chemical products of the reaction which takes place on the surface of 28. Insulating spacers 33 and 34 separate 25 from 26 and confine reacting gases and vapors to the area occupied by 28.

Figure 5:
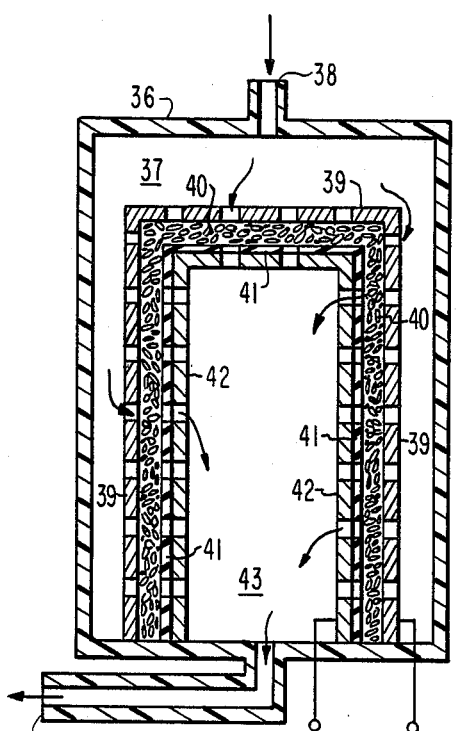
FIG. 5 shows an enclosed chemical reaction chamber having perforated electrodes supporting catalytic material between the electrodes.

In FIG. 5, the reaction chamber wall 36 encloses an inlet plenum 37 which receives reactant gases through inlet port 38. The gases pass through perforated plate 39 which is the plate of an electric capacitor and the gases are then contacted on the surfaces of electrically activated compounds 40 which are the type of compounds 19 described in FIG. 3. Examples of these compounds are titanium oxide, $TiO_2$, and titanium oxide doped with iron, $TiO_2.Fe$. Other examples are $Al_3O_3N$ doped with Mn, $SrTiO_3$, and $SrTiO_3$ doped with rhodium. Barium titanate and calcium titanate, $BaTiO_3$ and $CaTiO_3$ as well as calcium tungstate, $CaWO_4$ are also examples of chemical compounds which can be activated into an excited state to provide catalytic effects in that state. Aluminum nitride as well as silicon carbide, also beryllium oxide, magnesium oxide and the compounds above each react nitrogen with hydrogen to provide ammonia. These same compounds also assist the reaction of the same molecular nitrogen with water vapor to produce ammonia. These compounds also promote the combination molecular nitrogen with oxygen. In this same FIG. 5 the perforated insulating film 41 serves the same function as film 27 in FIG. 4. In FIG. 5 the perforated capacitor plate 42 reacts electrically with 39 to provide an electric field through 40 to activate 40. The shape of electric capacitor plate 42 enables 42 to enclose a cavity which is exit plenum chamber 43 which receives product gases from 40 and conducts them to exit port 44. The reaction chamber wall 36 is made of insulating plastic to support plates 39 and 42 and to prevent a current shunt between 39 and 42 at the place where they are supported. In one embodiment 39 and 42 each have the shape of perforated cylinders with perforated covers and 39 encloses 42 in such a way that gas fluid flow from plenum 37 must enter through the perforations of 39 onto 40 and must leave 40 through the perforations in 42 to enter plenum 43.

Figure 6:
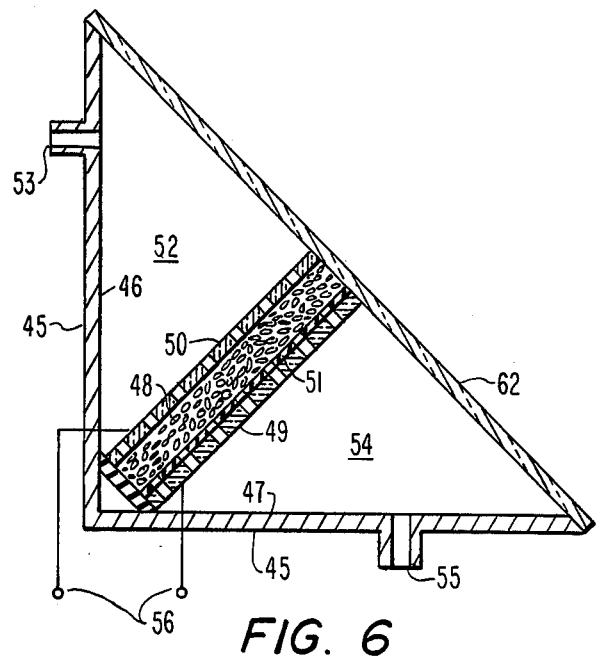
FIG. 6 shows a trough with a transparent cover to admit light to a chemical reaction cell along the center of the trough.

In FIG. 6, the trough 45 has reflective inner surfaces 46 and 47 which reflect light onto electrophotoluminescent material 48 through electrically conductive transparent plates 49 and 50. The plates 49 and 50 are perforated or porous transparent material such as glass or plastic with an electrically conductive, transparent coating over at least one surface. The plates 49 and 50 function as the plates of an electric capacitor to place an alternating field across excited state material 48 according to the principal embodiment. In an alternate embodiment 49 and 50 are electrodes with opposite direct current polarity to conduct direct current through excited state material 48. In the principal embodiment the perforated, dielectric layer 51 insulates electrically material 48 from plate 49 to provide electric capacitance between 49 and 50. Layer 51 is not present when direct current is employed in place of alternating current. The transparent cover 52 admits light energy to surfaces 46 and 47 as well as to opposite sides of 48. Material 48 is similar to the material 40 in FIG. 5 but in this FIG. 6 the activated material is not only electroluminescent but photoluminescent as well. Light energy and electric energy are used to stimulate excited state material into a catalytically active condition. For instance magnesium orthotitanate, $Mg_2TiO_4$, activated with manganese is photoluminescent and electroluminescent and have enhanced catalytic properties when stimulated with both an electric field and light energy. In a similar way $Al_2O_3$ is electroluminescent and is activated to a photoluminescent condition by combining with any of the following, i.e. with $Cr_2O_3$, or with $Rh_2O_3$, or with $Ti_2O_3$, or with $TiO_2$ or with Pt, or with Mn. When the combination of the $Al_2O_3$ with any of the above activators is accomplished by using proportions of the activator which do not destroy the electroluminescence of the $Al_2O_3$, then the compounds formed are both photoluminescent and electroluminescent. $Al_2O_3$ fused at 1000° C. with Al in nitrogen and doped with Cr produces $Al_3O_3N$ Cr, a photoluminescent phosphor that is also electroluminescent and capable of catalytic effects that are enhanced by both types of stimulation at the same time. In the same way $BaTiO_3$ is electroluminescent and may be activated to a photoluminescent condition by doping with samarium in order to provide an activated catalyst that is stimulated by both sources of energy. Reactant gases and vapors such as a mixture of water vapor and molecular nitrogen are admitted to reactant plenum chamber 52 through inlet duct 53 and pass over 48 where they are reacted into products. Products, such as ammonia, then move into product plenum chamber 54 and out exit duct 55. Terminals 56 connect plates 49 and 50 to current.

Figure 7:
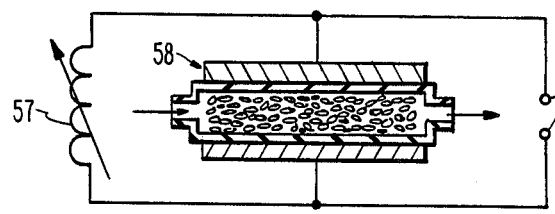
FIG. 7 shows an electric diagram of a circuit having an inductor across a capacitive reaction cell and an alternating electric current source.

Referring to FIG. 7, the variable inductor 57 provides an adjustable inductive reactance to match the capacitive reactance of the electroluminescent-catalytic cell 58 at the particular frequency of the A.C. current. When 57 and 58 are in resonance, alternating current that is cycling in the circuit without doing work will not consume electric energy in the form of watts, but will merely cycle back and forth as voltage amperage reactive. While a variable inductor is shown as the means of resonating the circuit, other means not shown are obvious to those skilled in the art. The inductor may be a fixed value inductor and the capacitance in parallel with the inductor may be provided by either a variable capacitor in series with the cell 58 or by one in parallel with 58 depending upon the numerical values of capacitance required for resonance. The electric terminals 59 provide for a connection to an alternating current source not shown. It is not intended to limit the inventive concept to a particular frequency of alternating current. Many conventional phosphors electroluminesce at sixty Hertz while some phosphor grains with piezoelectric qualities are more efficiently activated at a frequency of fifty megahertz, such as $BaTiO_3$.

Throughout the drawings capacitive type electroluminescent cells are shown and dielectric material is depicted between capacitor plates but it is not intended to limit the inventive concept to a capacitive cell alone and accordingly both electrically conductive phosphor and phosphor-like compounds as well as semiconductive kinds are to be used in which the catalytic material conducts current from one electrode to the other. Either direct current or alternating current may be conducted in this way by direct contact with the excited state compounds. In the principal embodiment, in which true electroluminescence is employed, care is taken to insure that dielectric breakdown or arcing does not occur at the points where grains of catalyst contact each other. This is done by careful control of voltage and current applied across the capacitor plates of the cell. In other embodiments electric discharge in the gas between the grains or by dielectric breakdown is employed as a means of generating ultraviolet light energy to stimulate light-activated phosphors and phosphor-like catalysts. In this embodiment higher voltages are employed in order to ionize the gas between the grains so that even grains deep within the catalytic bed will be excited on all sides by the light from ionization. While the above embodiments are distinct and are used separately for the distinct advantages described previously, they are not necessarily mutually exclusive but are combined in an embodiment that provides reactant activation both by localized discharge in the gas between phosphor grains as well as by surface contact of the reactant gases with the electrically excited phosphors. This embodiment is accomplished by applying voltages of ionizing potential across the electrodes.

It is also not intended to limit the inventive concept to the employment of a single excited state compound between the electrodes at any given time, but mixtures of compounds are also employed. Some of the compounds of the mixture then have one or more functions the same as functions of other compounds in the mixture in some embodiments, and in other embodiments the compounds of the mixture have different functions one from another. For instance in one mixture a phosphor with very strong electroluminescence but with limited surface absorption capability is used to produce light energy throughout a deep catalytic bed in order to stimulate photo-catalytic compounds which are also part of the mixture and do have absorbent, active surfaces for reacting gas phase reactants. Examples of this embodiment are mixtures of ZnS, ZnSe, CdS, GaP which are strong light emitters to which is added titanium oxide, $TiO_2$ doped with iron. The $TiO_2$.Fe absorbs and reacts $N_2$ with water vapor producing $NH_3$ when the $TiO_2$.Fe is stimulated by pervasive light generated on every side of its grains by the electroluminescent phosphors with which it is mixed. In another example boron nitride is electrically activated to generate ultraviolet light in a mix of BN and $SrTiO_3$.Rh. In this case the rhenium doping assists in the surface contacting of $N_2$ and $H_2$ on the surface of $SrTiO_3.Rh$. Ultraviolet light from the BN excites the $SrTiO_3.Rh$. Ammonia is produced as a result of the surface activation. In another instance a mixture of electroluminescent calcium tungstate with electroluminescent titanates such as barium titanate and strontium titanate is used to provide a broad spectrum of excitation energy for absorbed nitrogen and hydrogen or for absorbed nitrogen and water vapor in order to produce ammonia on the surfaces of the grains of the mixture. Similarly, electroluminescent compounds containing aluminum nitride and their mixtures are examples of excited state compounds that are employed in a cell of this invention which uses two emodiments of the basic inventive concept. For instance, a mixture of AlN with AlN doped with 2 mole percent of manganese and also AlN doped with 5 percent or less of silica is placed between the electrodes and subjected to an alternating electric current of sufficient potential both to stimulate true electroluminescence as well as to produce localized electric discharge in the gas between the phosphor grains. In this way hydrogen and nitrogen flowing through the catalytic bed of the mixture are activated both by ionizing discharge as well as by surface contact with the electrically excited aluminum nitrides. Activated hydrogen and activated nitrogen interact with the aluminum nitride material to produce ammonia.

A mixture of MgO with $TiO_2$ and the photoluminescent phosphor $Mg_2TiO_4Mn$ is an example of an excited state activation system which embodies the joint use of electroluminescence and photoluminescence. MgO and $TiO_2$ are both electroluminescent and both absorb and react nitrogen and hydrogen to produce ammonia. Both of these phosphors also emit light which is here used to excite the photoluminescent phosphor, $Mg_2TiO_4.Mn$ and cause it to absorb and react nitrogen and hydrogen to produce $NH_3$. Additional light energy may be used to augment the electroluminescent light according to the mechanism described in FIG. 6.

Titanium oxide and ruthenium oxide mixtures provide photocatalytic systems in the present art used for the decomposition of water with ultraviolet light. In the present invention the requirement for an ultraviolet stimulation source is obviated by electroluminescent stimulation of the $TiO_2$ and $RuO_2$. The active hydrogen which results from the decomposition is used here for the catalytic reduction of activated nitrogen. Water vapor and nitrogen are reacted on the mixture to provide ammonia.

During the development of the inventive concept research indicated that there is another class of phosphors which have catalytic and activation properties which are developed or enhanced by a distinctive type of activation into the excited state. These are compounds which exhibit electronoluminescence and ionoluminescence. In these compounds it is the impact of electrons and of ions respectively which raise the compounds into the excited state and activate them chemically into excited state catalysts. These compounds are activated according to the present invention by the use of the electroluminescent cell herein described when the gas pressure of the reactants in the cell is reduced and the voltage is increased to provide electric discharge across the grains of the compounds in the cell and electric discharges through the gases between the same grains. Free electrons in the reactant gases between the grains are accelerated by the field and collide with atoms to release other electrons and to produce ions in an avalanche effect. The newly released ions and electrons are in turn accelerated by the electric field and impact the phosphor-catalyst compounds thereby stimulating them into an excited state in which they become chemical activators to absorb and to react the gases contacting their surfaces. Examples of compounds which are stimulated into luminescence or excited states with enhanced catalytic effects by electron impact are $ZrO_2.Ti$, $ZrO_2.Fe$, BaO, MgO, BaSrO, SrO, BeO. When used with the means provided in the present invention and with ionizing conditions of high voltage and reduced pressure these compounds and their mixtures catalyze the reaction of nitrogen and hydrogen to produce ammonia and the reaction of nitrogen and oxygen to produce nitrogen oxides.

I claim:

1. A gas phase chemical reaction system comprising:
   (1) phosphor-catalyst electric excitation means capable of placing an electric field across excited state compounds selected from the group of electroluminescent phosphors and phosphor-like compounds into which catalytic properties are induced and enhanced directly by the application of said field, said electric excitation means being in the form of at least two electrodes located on opposite sides of a layer of said compounds with the electrodes having surfaces of significant area located opposite each-other and being connected across a source of electric current in such a way that each electrode has a polarity opposite to the other during each period of current application and,
   (2) gas particle activation means in the form of a catalytic bed which forms said layer of said excited state compounds located between the electrodes and being capable of providing surface contact between reactant gas particles and said excited state compounds for the purpose of transferring excitation energy from the compounds to the reactant gas species to react the species and,
   (3) reactant and product transport means in the form of inlet and exit ports, inlet and exit plenum chambers and gas permeable perforations in the electrodes on either side of the electrically excited compounds, said reactant transfer means being in the form of ducting and sealed connections providing series fluid flow communication between the inlet port, the inlet plenum chamber, perforations in one electrode and the electrically excited catalytic material, and said product transfer means being in the form of ducting and sealed connections providing series fluid flow communication between said electrically excited compounds, perforations in the opposite electrode, the exit plenum and the exit port.

2. A chemical reaction system as in claim 1 in which the phosphor-catalyst electric excitation means is also has an insulating layer of dielectric material interposed between the electrodes, between one electrode and the excited material, being immediately adjacent to that electrode, said dielectric layer thereby electrically insulating the excited state compounds from a constant flow of direct electric current and providing electric capacitance to be formed between the electrodes and an electric field to be produced across the excited state compounds, and in which the source of electric current is a source of alternating electric current.

3. A chemical reaction system as in claim 2 in which the electrodes of the phosphor-catalyst excitation means are perforated electrodes having gas permeable perforations and in which the dielectric layer interposed between the electrodes is a perforated dielectric layer on which the positions of the perforations coincide with the positions of the perforations in the electrode adjacent to it thereby providing fluid flow communication through the electrode and the dielectric to the excited state compounds and from the compounds through the other electrode.

4. A gas phase chemical reaction system as in claim 2 in which the electric capacitance of the phosphor-catalyst excitation means is connected electrically across an inductor capable of resonating the inductive-capacitive circuit so formed to the frequency of the alternating current source.

5. A chemical reaction system system as in claim 1 in which the source of electric current, across which the electrodes of the phosphor-catalyst electric excitation means are connected, is a source of direct current.

6. A gas phase reaction system as in claim 1 in which the catalytic bed of excited state compounds is a layer of compounds selected from the group consisting of $TiO_2$, $TiO_2.Fe$, $SrTiO_3$, $SrTiO_3.Rh$, $BaTiO_3$, $CaTiO_3$, $CaWO_4$, $SiC$, $BeO$, $MgO$, $AlN$ and $Al_3O_3N.Mn$.

7. A gas phase chemical reaction system as in claim 6 in which the reactant gas particles of the gas particle activation means are hydrogen and nitrogen and the product of the product transport means is ammonia.

8. A gas phase chemical reaction system as in claim 6 in which the reactant gas particles of the gas particle excitation means are of nitrogen and water vapor and the product of the product transport means is ammonia.

9. A gas phase chemical reaction system as in claim 6 in which the reactant gas particles are of nitrogen and oxygen and the product of the product transport means is nitrogen oxides.

10. A gas phase chemical reaction system as in claim 1 in which the catalytic bed of excited state compounds is a layer of compounds selected from the group consisting of $Mg_2TiO_4.Mn$, $Al_2O_3.Cr_2O_3$, $Al_2O_3.Rh_2O_3$, $Al_2O_3.Ti_2O_3$, $Al_2O_3.TiO_2$, $BaTiO_3.Sm$, $Al_3O_3N.Cr$.

11. A gas phase chemical reaction system as in claim 10 in which the reactant gas particles are of nitrogen and hydrogen and the product of the product transport means is ammonia.

12. A gas phase chemical reaction system as in claim 1 in which the catalytic bed of excited state compounds is a layer of compounds, excited by electron impact, selected from a group consisting of $ZrO_2.Ti$, $ZrO_2.Fe$, $BaO$, $MgO$, $BaSrO$, $SrO$ and $BeO$.

13. A gas phase chemical reaction system as in claim 1 in which the catalytic bed of excited state compounds is a layer of mixtures of compounds selected from the group of mixtures consisting of a strong electroluminescent phosphor and $TiO_2.Fe$, of $BN$ and $SrTiO_3.Rh$, of $AlN$, $Mn$ and $AlN.Si$, of $MgO$ and $TiO_2$ and $Mg_2Ti\ O_4$, $Mn$, of $TiO_2$ and $RuO_2$.

14. A gas phase chemical reaction system comprising:
(1) phosphor-catalyst electric excitation means capable of placing an electric field across a mixture of excited state compounds, part of the mixture being comprised of light emitting electroluminescent phosphors and the other part of the mixture being excited state compounds selected from the group of phosphors and phosphor-like compounds into which catalytic properties are induced and enhanced by light energy, said electric excitation means being in the form of at least two electrodes located on opposite sides of a layer of said compounds with the electrodes having flat surfaces located opposite each other and being connected across a source of electric current in such a way that each electrode has a polarity opposite to the other during each period of current application and, (2) gas particle activation means in the form of a catalytic bed of said mixture of said excited state compounds located between the electrodes and being capable of providing surface contact between the reactant gas particles and said excited state compounds with the induced catalytic properties for the purpose of transferring excitation energy from the compounds to the reactant gas species to react the species and, (3) reactant and product transport means in the form of inlet and exit ports inlet and exit plenum chambers and gas permeable perforations in the electrodes on either side of the electrically excited compounds, said reactant transfer means being in the form of ducting and sealed connections providing series fluid flow communication between the inlet port, the inlet plenum chamber, perforations in one electrode and the mixture of excited state compounds, and said product transfer means being in the form of ducting and sealed connections providing series fluid flow communication between said mixture of excited state compounds, perforations in the opposite electrode, the exit plenum and the exit port.

15. A gas phase chemical reaction system as in claim 14 in which the mixture of excited state compounds is a mixture of light emitting electroluminescent phosphors selected from the group consisting of $ZnS$, $ZnSe$, $CdS$, $GaP$ and $BN$ and of induced catalytic excited state compounds selected from the group consisting of $TiO_2.Fe$, $SrTiO_3.Rh$, $RuO_2$ with $TiO_2$, and in which the reactant gas particles are of nitrogen and hydrogen and the product of the product transport means is ammonia.

16. A gas phase chemical reaction system comprising:
(1) Phosphor-catalyst electric excitation means capable of placing an electric field across excited state compounds of the kind excited by electron and ion impact into which catalytic properties are induced and enhanced by the collision of electrons and ions accelerated by said field, said electric excitation means being in the form of at least two electrodes on opposite sides of a layer of said compounds with the electrodes having flat surfaces located opposite each other and being connected across a source of electric current of sufficient potential as to ionize gas between grains of said compounds and in such a way that each electrode has a polarity opposite to the other during each period of current application and, (2) gas particle activation means in the form of a catalytic bed of said excited state compounds located between the electrodes and being capable of providing surface contact between reactant gas particles and said excited state compounds for the purpose of transferring excitation energy from the compounds to the reactant gas species to react the species and, (3) reactant and product transport means in the form of inlet and exit ports, inlet and exit plenum chambers and gas permeable perforations in the electrodes on either side of the electron impact excited compounds, said reactant transfer means being in the form of ducting and sealed connections providing series fluid flow communication between the inlet port, the inlet plenum chamber, perforations in one electrode and the electron impact excited material, and said product transfer means being in the form of ducting and sealed connections providing series fluid flow communication between said electron impact excited compounds, perforations in the opposite electrode, the exit plenum and the exit port.

17. A gas phase chemical activation system as in claim 16 in which the catalytic bed of the excited state compounds excited by electron impact is a layer of compounds selected from the group consisting of $ZrO_2 \cdot Ti$, $ZrO_2 \cdot Fe$, $BaO$, $MgO$, $SrO$, $BaSrO$ and $BeO$.

* * * * *